United States Patent Office 3,660,531
Patented May 2, 1972

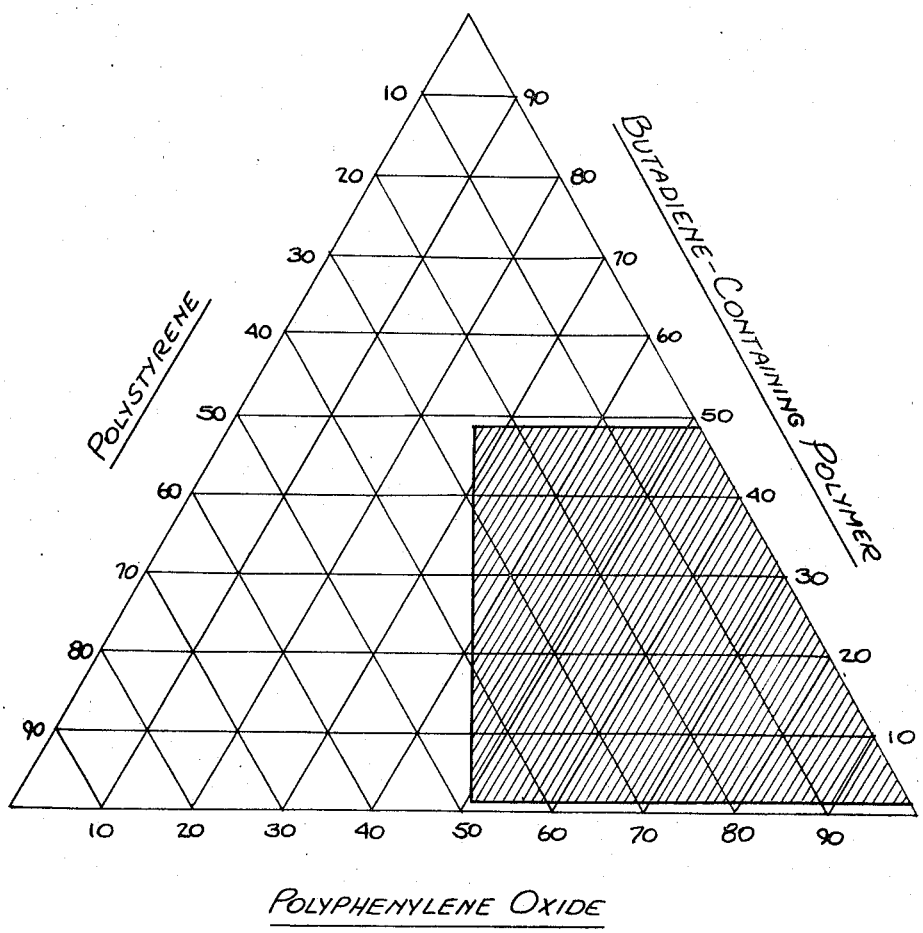

3,660,531
THERMOPLASTIC RESIN BLEND OF POLY-PHENYLENE OXIDE WITH BUTADIENE-CONTAINING POLYMERS
Robert L. Lauchlan, Granger, and Gray A. Shaw, South Bend, Ind., assignors to Uniroyal, Inc., New York, N.Y.
Continuation-in-part of application Ser. No. 741,193, June 28, 1968. This application June 4, 1969, Ser. No. 830,472
Int. Cl. C08f 29/12, 41/12
U.S. Cl. 260—876 B
51 Claims

ABSTRACT OF THE DISCLOSURE

Blends of thermoplastic polyphenylene oxide resin (which optionally contains an alkenyl aromatic polymer such as a styrene polymer) with butadiene homopolymers and copolymers are characterized by an unusually useful combination of properties, particularly low temperature melt processability in combination with high impact strength and flexural strength.

This is a continuation-in-part of U.S. patent application Ser. No. 741,193, filed June 28, 1968.

BACKGROUND OF THE INVENTION

(1) Field of the invention

This invention relates to synthetic thermoplastic resin compositions. More particularly, the invention relates to the resin blend which results from the physical admixing of a polyphenylene oxide thermoplastic resin which optionally contains an alkenyl aromatic polymer, and an elastomer selected from the group consisting of a butadiene polymer, a random, block or graft copolymer of butadiene and styrene, or a copolymer of butadiene and acrylonitrile.

(2) Description of the prior art

Thermoplastic polyphenylene oxide resins of the kind employed in the invention are disclosed in U.S. Pat. 3,306,874.

U.S. Pat. 3,356,761 discloses such polyphenylene oxides which are dissolved in styrene monomer and the styrene monomer subsequently polymerized into polystyrene to produce a mixture of polyphenylene oxide and polystyrene.

U.S. Pats. 3,373,226 and 3,383,435 also discloses mixture of polyphenylene oxide and styrene resin.

The mixtures disclosed in each of the aforementioned patents do not contain a rubber component which provides the desirable properties possessed by the blend of the present invention.

SUMMARY OF THE INVENTION

There is a need for reasonably priced plastic compounds with resistance to high temperatures which at the same time possess good flow characteristics and impact strength. Polyphenylene oxide possesses resistance to high temperature but is relatively difficult to process and the fabricated articles made therefrom possess low impact strength.

The present invention provides polyblends containing: (A) greater than 50% (all percentages are expressed by weight herein) of a thermoplastic resin matrix, said resin matrix consisting of polyphenylene oxide resin by itself or in combination with alkenyl aromatic resins; and (B) correspondingly less than 50% of an elastomer selected from the group consisting of poly(butadiene), random, block or graft copolymers of butadiene and styrene, designated poly(butadiene-co-styrene) and poly(butadiene-b-styrene), poly(butadiene-g-styrene) or poly(butadiene-co-acrylonitrile). The resulting blends exhibit unexpected thermoplastic properties including improved melt processability and impact resistance without sacrificing the desirable heat distortion temperature and flexural modulus of unmodified polyphenylene oxide resin.

DESCRIPTION OF THE DRAWING

In the attached drawing the shaded area indicates the general composition boundaries of the constituents of the blend. By way of illustration and not by way of limitation, the alkenyl aromatic component in said drawing is represented by the term polystyrene. It is to be noted that the amount of butadiene-containing polymer incorporated into a polyphenylene oxide or polyphenylene oxide-polystyrene matrix is in the range of greater than zero and less than 50%. Also, where the matrix is polyphenylene oxide-polystyrene, the ratio of polyphenylene oxide to polystyrene is greater than 1.

DESCRIPTION OF PREFERRED EMBODIMENT

The matrix or predominant portion of the resin-rubber polyblend consists of polyphenylene oxide, or alternatively a polyphenylene oxide modified with an alkenyl aromatic resin. The matrix constitutes greater than 50% of the blend and preferably between 95% and 60% of the blend. When the matrix contains both polyphenylene oxide and an alkenyl aromatic resin, the polyphenylene oxide content of the matrix is greater than 50%, preferably greater than 66% and the alkenyl aromatic resin content is less than 50%, preferably less than 34% but the total of both types of polymers must be in excess of 50% of the total weight of the resin-rubber blend.

In modifying said polyphenylene oxide, the alkenyl aromatic resins are introduced to improve the flow properties, and the butadiene-containing elastomers (also referred to as rubbers) are introduced to improve the impact properties thereof. The interpretation of the moduli of polymers presented in "Properties and Structures of Polymers," A. V. Tobolsky, pages 71–78, John Wiley & Sons, Inc., publishers, copyright 1960 is adopted herein as the criteria for determining whether a polymeric material is a resin or a rubber. Those polymeric materials which at ambient temperatures possess glassy character, and which, by reference to the aforementioned book, have Young's moduli in excess of $10^9$ dynes/cm.$^2$ are designated as resins.

Conversely, those polymeric materials which at ambient temperatures are leathery or rubbery in nature and which, by reference to the aforementioned book, have Young's moduli between $10^5$ and $10^9$ dynes/cm.$^2$ are designated as rubbers.

In either category, namely resin or rubber, the polymeric material may be a homopolymer, copolymer, terpolymer, etc., and the sequence of addition in the case of the polymers which contain more than one monomer may be either random, graft or block in nature. In the case of the copolymers, terpolymers, etc., it is possible to combine the monomers in proportions whereby they may exhibit resinous or rubbery properties. Whether it is designated as a resin or rubber will be dictated by its Young's modulus relative to that of the definitions cited above. It is also possible to combine the same proportion of monomers and derive copolymers, terpolymers, etc. which have different moduli depending on whether the monomers were interacted under conditions which give random, block or graft structures. Here again, the resulting polymeric species is designated as either a resin or rubber depending on its Young's modulus relative to the definitions set forth above.

The polyphenylene oxides which may be used in the present invention can be represented by the following formula for the repeating unit:

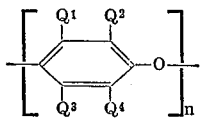

wherein $Q^1$ through $Q^4$ is a monovalent substituent selected from the group consisting of hydrogen, halogen, hydrocarbon radicals free of tertiary alpha-carbon atoms, halohydrocarbon radicals having at least two carbon atoms between the halogen atom and phenol nucleus and being free of tertiary alpha-carbon atoms, hydrocarbonoxy radicals free of tertiary alpha-carbon atoms, and halohydrocarbonoxy radicals having at least two carbon atoms between the halogen atom and phenol nucleus and being free of tertiary alpha-carbon atoms; and $n$ represents any whole integer greater than 100.

Typical examples of such polymers and methods of making same are found in U.S. Pats. 3,306,874; 3,306,875; 3,257,357; 3,361,851; and New Linear Polymers, by Lee et al., N.Y., McGraw-Hill, 1967, pages 61–82, the contents of which are incorporated herein by reference.

The alkenyl aromatic resins which may be used in the present invention all possess a resinous Young's modulus as given above and include homopolymers prepared from monoalkenyl aromatic compounds having the general formula

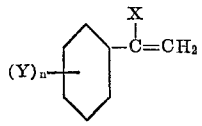

wherein X represents hydrogen or a lower alkyl radical such as a methyl or ethyl radical; Y represents a member of the group consisting of hydrogen, halogens having atomic numbers of from 17 to 35, inclusive, and lower alkyl radicals containing from 1 to 4 carbon atoms such as the methyl, ethyl, propyl, isopropyl, butyl, sec-butyl and tert-butyl radicals; and $n$ represents an integer from 1 to 5. Illustrative of the alkenyl aromatic compounds which are included with the above scope are, for example, styrene, α-methylstyrene, the mono-, di-, tri-, tetra- and penta-chlorostyrenes and α-methylstyrenes, and the nuclearly alkylated styrenes and α-alkylstyrenes such as ortho- and para-methylstyrenes, ortho- and para-ethylstyrene, ortho- and para-methyl-α-methylstyrene and the like. Constituents which may be copolymerized with the alkenyl aromatic compounds to make the alkenyl aromatic resins are those having the general formula

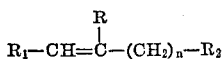

wherein R and $R_1$ each represent a substituent selected from the group consisting of hydrogen, halogen, an alkyl group having 1 to 4 carbon atoms, carboalkoxy, or R and $R_1$ compositely represent an anhydride linkage

and $R_2$ is hydrogen, vinyl, an alkyl or alkenyl group having 1 to 12 carbon atoms, cycloalkyl, carboalkoxy, alkoxy alkyl, alkyl carboxy, ketoxy, halogen, carboxy, cyano, or pyridyl group and $n$ is an integer between 0 and 9. The term "alkenyl aromatic resin" is also meant to include rubber-modified polystyrenes available in commerce. Thus, for example, suitable alkenyl aromatic resins include polystyrene, styrene acrylonitrile copolymers, styrene-butadiene copolymers, rubber-modified polystyrenes, styrene-acrylonitrile-α-alkylstyrene copolymers such as styrene-acrylonitrile-α-methylstyrene, and the like. In addition, other suitable polymers include graft copolymers of styrene or alpha-methyl styrene polymerized on a poly(butadiene), poly(butadiene-co-styrene), or poly(butadiene-b-styrene) of the SBS or SB type spine; graft copolymers of styrene or alpha-methyl styrene with vinyl monomers polymerized on a poly(butadiene), poly(butadiene-co-styrene), or poly(butadiene-b-styrene) of the SBS or SB type spine. The polystyrenes described above may be prepared using polymerization methods as described by Billmeyer in Textbook of Polymer Science, New York, Interscience Publishers, 1966.

Although any of the alkenyl aromatic compounds disclosed above can be used effectively to form the resinous component, the preferred compounds to be used are styrene and alpha methyl styrene, and further discussion of the alkenyl aromatic component will be mainly in terms of these compounds.

It will be obvious to those skilled in the art that many other styrene-containing copolymers not mentioned above may be used effectively in the present invention as long as said polymer possesses a Young's modulus greater than $10^9$ dynes/cm.$^2$ and functions to improve the melt processability of the polyphenylene oxide.

A suitable commercially available polystyrene modified polyphenylene oxide is sold by General Electric under the trademark "Noryl." Polyphenylene oxide is a material possessing high heat distortion temperature and good dimensional stability under load and because of these properties has commercial potential. However, two recognized disadvantages are the necessity for high temperature processing and its relatively low impact strength at room temperature and below. The introduction of polystyrene type materials into polyphenylene oxide without the introduction of rubber as taught herein, allows the modified polyphenylene oxide to be processed at lower temperature without significantly altering the impact strength thereof.

The suitable rubber polymers cited above which are blended with the resin may be prepared using known methods. Thus, polybutadiene may be prepared using the methods cited by Stille in Introduction to Polymer Chemistry, John Wiley & Sons, New York, Second Printing 1966, pages 183–186. The preparation of a random or block copolymer of butadiene and styrene (called SBR) is found in Stille, ibid, pages 200 to 203, 213. Such random or block copolymers used herein may contain varying amounts of styrene units and butadiene units within the Young's modulus value for rubber given above. The butadiene (B)-styrene (S) block copolymers used herein can be of the type S-B or S-B-S etc. Generally the rubber copolymers of styrene-butadiene at room temperature may contain up to 75% styrene and 25% butadiene.

The preparation of the butadiene-acrylonitrile copolymer is found in Stille, ibid, pages 203 to 204. Such random copolymers also may contain various amounts of butadiene units and acrylonitrile units within the Young's modulus values for rubber given above.

Generally the rubber copolymers of styrene-acrylonitrile at room temperature may contain up to 75% styrene and 25% acrylonitrile.

In the present discussion when naming the various copolymers and graft copolymers, random copolymers are indicated by the prefix -co-, block copolymers by the prefix -b-, and graft copolymers by the prefix -g-. A more detailed discussion of this nomenclature is found in Graft Copolymers, Interscience Publishers, N.Y., 1967, pages 10–16.

To prepare the blend of the invention, the two starting polymers, namely, the resin matrix and rubber may be mechanically blended together in the desired proportions with the aid of my suitable mixing device conventionally used for mixing rubbers or plastics, such as a differential roll mill, a Banbury mixer, or an extruder. In order to facilitate thorough mixing of the polymers and to develop the desired improved combination of physical properties, the mechanical blending is carried out at sufficiently high temperatures to soften the polymers so that they are thoroughly dispersed and intermingled with each other. The mixing temperature will in general vary with the composition of the rubbery butadiene homopolymer or copolymer and particular matrix employed; usually the polyphenylene oxide, which is the higher-softening material, will govern the mixing temperature selected. Mixing is continued until a uniform blend is obtained.

Alternatively the matrix resin and rubber may be solution blended by dissolving the polymers in a solvent such as tetrahydrofuran and subsequently precipitating the polymer blend by adding the solution to a non-solvent such as isopropanol to produce a homogeneous blend which is then dried by any suitable method.

There are various advantages which result from blending a butadiene polymer or copolymer into a polyphenylene oxide or polyphenylene oxide-polystyrene matrix. It has been determined that the rubbery butadiene homopolymer or copolymer and polystyrene individually reduce the heat distortion temperature of polyphenylene oxide. In blends containing both of these additives, the reduction in heat distortion temperatures is approximately additive. For example, a blend of 80% polyphenylene oxide and 20% poly(butadiene-b-styrene) has a heat distortion temperature 50° F. lower than polyphenylene oxide. A blend of 80% polyphenylene oxide and 20% general polystyrene has a heat distortion temperature 50° F. lower than polyphenylene oxide. A blend of 60% polyphenylene oxide, 20% poly(butadiene-b-styrene) and 20% general purpose polystyrene has a heat distortion temperature 80° F. lower than polyphenylene oxide.

The flexural modulus of polyphenylene oxide is increased by the incorporation of a polystyrene therein but is somewhat reduced by the addition of the rubbery butadiene homopolymer or copolymer. Therefore because of these opposing effects, by the addition of appropriate amounts of polystyrene and poly(butadiene), poly(butadiene-co-styrene), poly(butadiene-b-styrene), poly(butadiene-g-styrene), poly(butadiene-co-acrylonitrile) etc., into polyphenylene oxide, it is possible to retain the relatively high flexural modulus possessed by polyphenylene oxide. Since a resinous polystyrene is less expensive than the rubbery butadiene polymers employed in the present invention, there is a cost saving in partially replacing the rubbery homopolymer or copolymer with the resinous polystyrene.

Blending in a rubbery butadiene homopolymer or copolymer significantly improves the impact strength of polyphenylene oxide. Blending in the same amount of impact polystyrene also increases the impact strength of polyphenylene oxide, but not nearly as much as in the case of the butadiene polymer.

The preceding trends of properties of polyphenylene oxide upon the addition of the rubbery butadiene homopolymer or copolymer and/or a polystyrene are observed whether the mixing is by solution, a mill, or a Banbury.

The degree of change in physical properties is also dependent upon whether general purpose or impact polystyrene is used or whether a poly(butadiene), a random block or graft butadiene-styrene copolymer or random butadiene-acrylonitrile copolymer is the rubber component. This becomes evident by comparing the heat distortion and the low temperature properties of the blend. For example, for a given polystyrene the block poly(butadiene-b-styrene) copolymer produces blends possessing higher low temperature impact strengths, but lower heat distortion temperatures than the random poly(butadiene-co-styrene) copolymer. In the case of the block poly(butadiene-b-styrene) copolymer, better low temperature properties were obtained with general purpose-grade polystyrene than with impact-grade polystyrene. However, in the case of the random poly(butadiene-co-styrene) copolymer better low temperature properties were exhibited with impact-grade strength.

The mixtures of this invention may contain certain other additives to plasticize, extend, lubricate, prevent oxidation, flame retardants, dyes, pigments, etc. to the mixtures. Such additives are well-known in the art and may be incorporated without departing from the scope of the invention.

Examples 1 and 2 are included to illustrate the methods of mixing the various components used in the present invention.

EXAMPLE 1

This example illustrates the degree of improved melt processability achieved by *solution* blending a polystyrene with polyphenylene oxide at the 40% polystyrene level. Polyphenylene oxide requires a minimum milling temperature of 475° F., whereas the polyblend can be successfully milled at 375° F.

The polystyrene used was a general purpose grade coded 300 manufactured by Shell Chemical Company and was solution blended in tetrahydrofuran with polyphenylene oxide manufactured by General Electric Company and coded 531–801. The resin mixture was precipitated by adding the solution into an excess of isopropanol. The dried blend was subsequently processed on a differential roll mill for 10 minutes at 425° F. and then calendered at 425° F. The calendered product was molded at 450° F. and 350 p.s.i. to make ¼ inch thick test samples. The properties of the molded samples are set forth in Table I.

EXAMPLE 2

This example illustrates the degree of improved melt processability achieved by milling pre-blended powders of a general-purpose grade polystyrene coded 300 and manufactured by the Shell Chemical Company and polyphenylene oxide of the type described in Example 1 at the 40% styrene level. As shown in Table I, reduction in the minimum milling temperature was observed similar to Example 1. The polyblend was subsequently calendered and molded using the procedure described in Example 1, and the properties of the molded samples are set forth in Table I.

TABLE 1.—A COMPARISON OF POLYPHENYLENE OXIDE–POLYSTYRENE BLENDS WITH PURE POLYPHENYLENE OXIDE

| | 100% PPO [1] | Example 1, 60% PPO,[1] 40% PS [2] | Example 2 60% PPO,[1] 40% PS [2] |
|---|---|---|---|
| Blending technique | | Solution | Mill |
| ¼" notched Izod, ft. lbs./in.: | | | |
| +73° F | 1.21 | 0.45 | 0.44 |
| −40° F | 1.33 | 0.58 | 0.56 |
| Heat distortion temp., ° F., 264 p.s.i | 368 | 290 | 283 |
| Tensile strength, p.s.i | 10,373 | 10,620 | 8,628 |
| Tensile modulus, p.s.i | 303,296 | 403,207 | 413,877 |
| Flexural strength, p.s.i | 14,762 | 13,831 | 12,616 |
| Flexural modulus, p.s.i | 352,418 | 411,776 | 425,612 |
| Rockwell hardness (scale) | 124 | 125 | 125 |
| Minimum milling temp., ° F | 475–500 | 375–400 | 375–400 |

[1] PPO = Polyphenylene oxide General Electric 531–801.
[2] PS = General purpose polystyrene.

EXAMPLE 3

This example illustrates the degree of impact improvement achieved by Banbury blending the poly(butadiene-b-styrene) known as Thermolastic 125 produced by Shell Chemical Company with polyphenylene oxide of the type described in Example 1 at the 20% elastomer level. The elastomer was blended into polyphenylene oxide in the Banbury for 3.5 minutes at or above the critical fluxing temperature of 450° F. and at a shear rate of about 630 sec.$^{-1}$. The stock was dropped onto a differential roll mill at 440° F. and subsequently calendered at 450° F.

The calendered product was molded at 525° F. and 350 p.s.i. to make ¼ inch thick test samples.

As shown in Table II, the room temperature notched Izod impact value of the polyblend is significantly higher than that of the polyphenylene oxide resin at a heat distortion temperature of 309° F. The notched Izod impact value for this blend at −40° F. is also significantly higher than the base resin, i.e. 3.76 for the polyblend compared to 1.3 for the base resin.

EXAMPLE 4

This example illustrates the degree of impact improvement achieved by solution blending the Thermolastic 125, poly(butadiene-b-styrene), with polyphenylene oxide at the 20% elastomer level using the method described in Example 1. As shown in Table II, the notched Izod impact values are significantly higher than those of polyphenylene oxide at a heat distortion temperature of 321° F.

EXAMPLE 5

This example illustrates the degree of impact improvement achieved by Banbury blending the poly(butadiene-co-styrene) coded Synpol 1500 manufactured by Texas-U.S. Chemical Co., with polyphenylene oxide at the 20% elastomer level using the method described in Example 3.

As shown in Table II, the notched Izod impact values of the polyblend are significantly higher than those of the polyphenylene oxide resin at a heat distortion temperature of 337° F. Where better low temperature impact properties are desired, e.g., at −40° F., there is an advantage in using the block copolymer of the type described in Example 3 in these blends.

TABLE II.—A COMPARISON OF POLYPHENYLENE OXIDE-POLY(BUTADIENE-STYRENE) BLENDS WITH PURE POLYPHENYLENE OXIDE

| | 100% PPO [1] | 80% PPO/20% block SBR [2] | | 80% PPO/ 20% random SBR,[3] Example 5 |
|---|---|---|---|---|
| | | Example 3 | Example 4 | |
| Blending technique | | Banbury | Solution | Banbury |
| ¼″ notched Izod, ft. lbs./in.+73° F | 1.21 | 6.75 | 5.82 | 4.23 |
| Heat distortion temp., ° F., 264 p.s.i | 368 | 309 | 321 | 337 |
| Tensile strength, p.s.i | 10,373 | 7,197 | 8,647 | 7,374 |
| Tensile modulus, p.s.i | 303,296 | 253,014 | 254,879 | 329,926 |
| Flexural strength, p.s.i | 14,762 | 10,807 | 12,503 | 10,434 |
| Flexural modulus, p.s.i | 352,418 | 293,067 | 304,948 | 262,100 |
| Rockwell Hardness | 124 | 115 | 120 | 117 |
| Minimum milling temp., ° F | 475-500 | 475-450 | 425-450 | 450-475 |

[1] = Polyphenylene oxide.
[2] = Block poly(butadiene-b-styrene).
[3] = Random poly(butadiene-co-styrene).

EXAMPLE 6

This example illustrates the degree of impact improvement combined with improved melt processability achieved by Banbury blending poly(butadiene-b-styrene) with an 80 polyphenylene oxide/20 polystyrene resin mixture at the 20% elastomer level. The three component polyblend system was mixed in the Banbury for 3.5 minutes at or above the critical fluxing temperature of 450° F. and at a shear rate of about 630 sec.$^{-1}$. The polyblend was dropped on a differential roll mill at 440° F. and subsequently calendered at 440° F. The calendered product was molded at 525° F. and 350 p.s.i. to make ¼ inch thick test samples. Comparison of the data shown in Table III with that shown in Table II shows that the notched Izod impact values of the polyblend are significantly greater than those of polyphenylene oxide at room temperature. The estimated minimum milling temperature of the polyblend is 50° F. lower than the base polyphenylene oxide resin.

EXAMPLE 7

This example illustrates the impact improvement and reduced melt processing temperature achieved by the incorporation of a poly(butadiene-b-styrene) into a mill blend of 80 polyphenylene oxide/20 polystyrene at the 20% elastomer level. The three component blend system was prepared by first fluxing a dry powder blend of polyphenylene oxide and polystyrene on a differential roll mill at 450° F. for 30 minutes. After the resins had fluxed, the elastomer was added over an additional 30 minute period. The mill stock was calendered at 450° F., pressed at 525° F. and 350 p.s.i. into ¼ inch thick test samples.

A comparison of the data shown in Table III, with that shown in Table II shows that the notched Izod impact value at room temperature is significantly higher than that of polyphenylene oxide.

EXAMPLE 8

This example illustrates the increased impact strength and improved melt processability achieved by solution blending 20% poly(butadiene-b-styrene) with 80% resin consisting of 80 polyphenylene oxide/20 polystyrene using the blending procedure described in Example 1. A comparison of the data shown in Table III, with that shown in Table II shows that the notched Izod impact values of the polyblend are higher than that of polyphenylene oxide whereas the maximum milling temperature is about 75° F. lower.

EXAMPLE 9

This example illustrates the effect of substituting random poly(butadiene-co-styrene) (Synpol 1500) for the block copolymer of Example 6 using the procedure set forth in such example. In Table III which follows, a comparison of the material prepared in Examples 6 or 9 with the base resin materials prepared in Examples 1 or 2 shows that either the block SBR copolymer or the random SBR copolymer in the blend improves the impact strength and processability of the blend.

TABLE III.—LISTING OF PROPERTIES OF VARIOUS POLYPHENYLENE OXIDE/POLYSTYRENE/POLY(BUTADIENE-STYRENE) BLENDS

| | 80% (80 PPO[1]/20 PS[2]), 20% SBR[3] | | | 80% (80 PPO[1] 20/PS[2]), 20% SBR,[4] Example 9 |
|---|---|---|---|---|
| | Example 6 | Example 7 | Example 8 | |
| Blending technique | Banbury | Mill | Solution | Banbury |
| ¼″ notched Izod ft. lbs./in. +73° F | 7.37 | 3.10 | 5.15 | 4.60 |
| Heat distortion temp., ° F., 264 p.s.i | 289 | 285 | 292 | 300 |
| Tensile strength | 7,121 | 8,820 | 7,890 | 7,212 |
| Tensile modulus | 266,331 | 329,537 | 316,527 | 278,626 |
| Flexural strength | 10,461 | 12,846 | 11,347 | 10,056 |
| Flexural modulus | 301,373 | 326,471 | 291,565 | 268,030 |
| Rockwell Hardness | 117 | 122 | 119 | 117 |
| Minimum milling temp., ° F | 400-425 | 400-425 | 400-425 | 400-425 |

[1] Polyphenylene oxide.
[2] Polystyrene.
[3] Block poly(butadiene-b-styrene).
[4] Random poly(butadiene-co-styrene).

EXAMPLE 10

This example illustrates the effect on the properties of a polyblend consisting of polyphenylene oxide, poly(butadiene-b-styrene) and polystyrene, when the polystyrene content is increased over that found in Example 6. A blend consisting of 20% poly(butadiene-b-styrene) with 80% of a resin containing 60 polyphenylene oxide/40 polystyrene was Banbury blended using the procedure described in Example 6.

As shown in Table IV, and in comparison with the data shown in Table III under Example 6, the melt processability surprisingly is increased without a significant reduction in impact strength.

EXAMPLE 11

This example illustrates the effect of replacing the poly(butadiene-b-styrene) of the polyblend of Example 10 with a random copolymer. In Table IV which follows, a comparison of the material prepared in Examples 10 or 11 with the base resin materials prepared in Examples 1 or 2 shows that either the block SBR copolymer or the random SBR copolymer in the blend improves the impact strength and processability of the blend.

Where better low temperature impact properties are desired, e.g. $-40°$ F., there is an advantage in using the block copolymer of the type described in Example 10.

EXAMPLE 12

This example illustrates the effect of replacing the general purpose polystyrene of the polyblend of Example 10 with impact polystyrene. As shown in Table IV, the mechanical properties were not significantly different from the properties of the material prepared in Example 10.

EXAMPLE 13

This example illustrates the effect of replacing the poly(butadiene-b-styrene) of the polyblend of Example 12 with a random poly(butadiene-co-styrene).

As shown in Table IV, the mechanical properties were not significantly different from the properties of the material prepared in Example 12.

EXAMPLE 14

This example illustrates the effect of the introduction of 20% of an SBS type of poly(butadiene-b-styrene) (Thermolastic 125) on the properties of a commercially available mixture of polyphenylene oxide and polystyrene (sold under the trademark "Noryl" and coded 731–701).

The Noryl resin was heat softened at 375° F. and the poly(butadiene-b-styrene) was added into the softened resin over a period of seven minutes, after which the mix was calendered at 380° F. Said calendered product was then molded at about 450° F. and 350 p.s.i. to make ¼ inch thick test samples.

A comparison of the notched Izod impact values of the material prepared in this example, as shown in Table V, with Noryl which has a value of 2.4 ft.-lb./in. shows said material prepared herein to have a significantly improved impact value. In addiiton the heat distortion temperature, tensile properties and flexural properties are acceptable.

EXAMPLE 15

This example illustrates the effect of the introduction of an SB type of poly(butadiene-b-styrene) with the Noryl resin described in Example 14 using the procedure described therein.

Again, as indicated in Table V, there is an improvement in the notched Izod impact value of the blend prepared herein over the Noryl material.

EXAMPLE 16

This example illustrates the effect of the introduction of 20% of a poly(butadiene-co-styrene) (coded Synpol 1500 and containing 77% butadiene-23% styrene) with the Noryl resin described in Example 14.

The Noryl resin was heat softened at 410° F. and the poly(butadiene-co-styrene) was added into the softened resin over a period of 15 minutes, after which the mix was calendered at 395° F. Said calendered product was then molded at about 520° F. and 350 p.s.i. to make ¼ inch thick samples.

A comparison of the notched Izod impact values of the material prepared herein (see Table V) with Noryl, shows said material prepared herein to have a significantly improved impact value.

TABLE IV.—COMPARISON OF BLEND PROPERTIES OF VARIOUS PPO/PS/SBR SYSTEMS

| | 80%, 60 PPO,[1] 40 PS,[2] 20% block SBR,[4] Example 10 | 80%, 60 PPO,[1] 40 PS,[2] 20% random SBR,[5] Example 11 | 80%, 60 PPO,[1] 40 IPS,[3] 20% block SBR,[4] Example 12 | 80%, 60 PPO,[1] 40 IPS,[3] 20% random SBR,[5] Example 13 |
|---|---|---|---|---|
| Blending technique | Banbury | Banbury | Banbury | Banbury |
| ¼″ notched Izod, ft. lbs./in.+73° F | 6.60 | 6.83 | 6.79 | 7.11 |
| Heat distortion Temp., ° F., 264 p.s.i | 244 | 270 | 243 | 266 |
| Tensile strength | 5,748 | 5,333 | 5,463 | 5,357 |
| Tensile modulus | 313,230 | 242,293 | 269,778 | 201,758 |
| Flexural strength | 9,678 | 8,170 | 7,618 | 6,479 |
| Flexural modulus | 312,600 | 253,316 | 249,106 | 200,857 |
| Rockwell Hardness | 115 | 109 | 109 | 103 |
| Minimum milling temp., ° F | 350–375 | 375–400 | 350–375 | 375–400 |

[1] Polyphenylene oxide.
[2] Polystyrene.
[3] Impact polystyrene.
[4] Block poly(butadiene-b-styrene).
[5] Random poly(butadiene-co-styrene).

TABLE V.—COMPARISON OF BLEND PROPERTIES OF VARIOUS NORYL/SBR SYSTEMS

| | 80% Noryl, 20% block SBS,[1] Example 14 | 80% noryl, 20% block SB,[2] Example 15 | 80% noryl, 20% random SBR,[3] Example 16 |
|---|---|---|---|
| Blending technique | Mill | Mill | Mill |
| ¼″ notched Izod, ft. lbs./in.+73° F | 8.90 | 3.41 | 8.20 |
| Heat distortion temp. (° F., 264 p.s.i.) | 224 | 231 | 241 |
| Tensile strength, p.s.i | 4,884 | 3,586 | 5,340 |
| Tensile modulus, p.s.i | 314,691 | 174,624 | 228,149 |
| Flexural strength, p.s.i | 7,915 | 7,246 | 7,831 |
| Flexural modulus, p.s.i | 271,800 | 249,182 | 245,500 |
| Rockwell Hardness | 105 | 98 | 106 |

[1] Block poly(butadiene-b-styrene) with the sequence being styrene/butadiene/styrene.
[2] Block poly(butadiene-b-styrene) with the sequence being styrene/butadiene.
[3] Random poly(butadiene-co-styrene).

EXAMPLE 17

This example illustrates the degree of impact improvement achieved by Banbury blending the stereoregular poly(butadiene) sold under the name Cis-4, having a Mooney viscosity (ML-4 at 212° F.) of 48, and produced by Phillips Petroleum Company, with polyphenylene oxide of the type described in Example 1 at the 20% elastomer level. The elastomer was blended into the polyphenylene oxide in the Banbury for 3.5 minutes at fluxing temperature of 460° F. and at a shear rate of about 630 sec.$^{-1}$. The stock was dropped onto a differential roll mill at 530° F. and subsequently calendered at 450° F.

The calendered product was molded at 500° F. and under 350 p.s.i. to make ¼ inch thick test samples.

As shown in Table VI the notched Izod impact values of the polyblend are significantly higher than those of the unmodified polyphenylene oxide resin while the heat distortion temperature of the blend is relatively uncharged.

TABLE VI.—COMPARISON OF RESIN AND POLYBLEND PROPERTIES

| | 100% polyphenylene oxide | 80% polyphenylene oxide, 20% polybutadiene |
|---|---|---|
| ¼" notched Izod (ft. lbs./in.): | | |
| +73° F | 1.2 | 5.5 |
| −40° F | 1.3 | 3.8 |
| Heat distortion temp. (° F., 264 p.s.i.) | 368 | 353 |
| Tensile strength (p.s.i.) | 10,400 | 6,000 |
| Tensile modulus (p.s.i.×10⁵) | 3.03 | 1.78 |
| Flexural strength (p.s.i.) | 14,700 | 8,000 |
| Flexural modulus (p.s.i.×10⁵) | 3.52 | 2.12 |
| Rockwell Hardness | 124 | 107 |
| Minimum milling temp. (° F.) | 475 | 475 |

EXAMPLE 18

This example illustrates the degree of impact improvement combined with improved melt processability achieved by Banbury blending a stereoregular poly(butadiene), having a Mooney viscosity (ML-4 at 212° F.) of 48 and sold under the name Cis-4, with a 60% polyphenylene oxide/40% polystyrene resin mixture at the 10% elastomer level. The three component polyblend system was mixed in the Banbury for 3.5 minutes at a fluxing temperature of 460° F. and at a shear rate of about 630 sec.$^{-1}$. The polyblend was dropped on to a differential roll mill at 420° F. and subsequently calendered at 440° F. The calender product was molded at 500° F. and 350 p.s.i. to make ¼ inch thick test samples. Comparison of the data shown in Table VII with that shown in Table II shows that the notched Izod impact values of the polyblend are significantly greater than those of polyphenylene oxide at room temperature.

TABLE VII.—COMPARISON OF RESIN AND POLYBLEND PROPERTIES

| | 100% polyphenylene oxide | 90% (60 polyphenylene oxide, 40 polystyrene), 10% butadiene |
|---|---|---|
| ¼" notched Izod (ft. lbs./in.): | | |
| +73° F | 1.2 | 3.1 |
| −40° F | 1.3 | 1.8 |
| Heat distortion temp. (° F., 264 p.s.i.) | 368 | 280 |
| Tensile strength (p.s.i.) | 10,400 | 7,600 |
| Tensile modulus (p.s.i.×10⁵) | 3.03 | 3.15 |
| Flexural strength (p.s.i.) | 14,700 | 12,100 |
| Flexural modulus (p.s.i.×10⁵) | 3.52 | 3.36 |
| Rockwell Hardness | 124 | 119 |
| Minimum milling temp. (° F.) | 475 | 400 |

EXAMPLE 19

This example illustrates the degree of impact improvement achieved by Banbury blending the poly(butadiene-co-acrylonitrile) containing 67% butadiene, 33% acrylonitrile and having a Mooney viscosity of 65, known as Paracril BLT produced by Uniroyal, Inc., with polyphenylene oxide of the type described in Example 1 at the 20% elastomer level. The elastomer was blended into polyphenylene oxide in the Banbury for 3.5 minutes at a fluxing temperature of 470° F. and at a shear rate of about 630 sec.$^{-1}$. The stock was dropped onto a differential roll mill at 480° F. and subsequently calendered at 450° F. at 350 p.s.i. to make ¼ inch thick test samples.

As shown in Table VIII the notched Izod impact values of the polyblend are significantly higher than those of the polyphenylene oxide resin. The heat distortion temperature of the polyblend is only 2° F. lower than that of the unmodified resin.

TABLE VIII.—COMPARISON OF RESIN AND POLYBLEND PROPERTIES

| | 100% polyphenylene oxide | 80% polyphenylene oxide, 20% poly (butadiene-co-acrylonitrile) |
|---|---|---|
| ¼" notched Izod (ft. lbs./in.) +73° F | 1.2 | 7.7 |
| Heat distortion temp. (° F., 264 p.s.i.) | 368 | 366 |
| Tensile strength (p.s.i.) | 10,400 | 6,100 |
| Tensile modulus (p.s.i.×10⁵) | 3.03 | 2.09 |
| Flexural strength (p.s.i.) | 14,700 | 9,000 |
| Flexural modulus (p.s.i.×10⁵) | 3.52 | 2.21 |
| Rockwell Hardness | 124 | 109 |
| Minimum milling temp. (° F.) | 475 | 475 |

EXAMPLE 20

This example illustrates the degree of impact improvement combined with improved melt processability achieved by Banbury blending poly(butadiene-co-acrylonitrile) known as Paracril BLT with an 60% polyphenylene oxide/40% polystyrene resin mixture at the 30% elastomer level as in Example 2. The three component polyblend system was mixed in the Banbury for 3.5 minutes at a fluxing temperature of 440° F. and at a shear rate of about 630 sec.$^{-1}$. The polyblend was dropped on a differential roll mill at 420° F. and subsequently calendered at 440° F. The calendered product was molded at 500° F. and 350 p.s.i. to make ¼ inch thick test samples. Comparison of the data shown in Table IX with that shown in Table II shows that the notched Izod impact value of the polyblend are significantly greater than those of polyphenylene oxide at room temperature.

TABLE IX.—COMPARISON OF RESIN AND POLYBLEND PROPERTIES

| | 100% polyphenylene oxide | 70% (60 polyphenylene oxide, 40 polystyrene), 30% poly (butadiene-co-acrylonitrile) |
|---|---|---|
| ¼" notched Izod (ft. lbs./in.): | | |
| +73° F | 1.2 | 5.3 |
| −40° F | 1.3 | 0.6 |
| Heat distortion temp. (° F., 264 p.s.i.) | 368 | 270 |
| Tensile strength (p.s.i.) | 10,400 | 4,900 |
| Tensile modulus (p.s.i.×10⁵) | 3.03 | 1.83 |
| Flexural strength (p.s.i.) | 14,700 | 7,700 |
| Flexural modulus (p.s.i.×10⁵) | 3.52 | 2.13 |
| Rockwell Hardness | 124 | 104 |
| Minimum milling temp. (° F.) | 475 | 400 |

EXAMPLE 21

This example illustrates the degree of impact improvement achieved by Banbury blending a partially crosslinked poly(butadiene-co-acrylonitrile) containing 32% acrylonitrile and having a Mooney viscosity (ML-4 at 212° F.) of 55 and sold under the name FRN 512 produced by Firestone Tire and Rubber Company with polyphenylene oxide of the type described in Example 1 at the 10% elastomer level. The elastomer was blended into the polyphenylene oxide in the Banbury for 7 minutes at or above fluxing temperature of 460° F. and at a shear rate of about 630 sec.$^{-1}$. The stock was subsequently calendered at 500° F.

The calendered product was molded at 500° F. and 350 p.s.i. to make ¼ inch thick test samples.

As shown in Table X the notched Izod impact values of the polyblend are significantly higher than those of the unmodified polyphenylene oxide resin while the heat distortion temperature of the blend is relatively unchanged.

TABLE X.—COMPARISON OF RESIN AND POLYBLEND PROPERTIES

| | 100% polyphenylene oxide | 90% polyphenylene oxide, 10% poly(butadiene-co-acrylonitrile) |
|---|---|---|
| ¼″ notched Izod (ft. lbs./in.): | | |
| +73° F | 1.2 | 4.53 |
| −40° F | 1.3 | 1.07 |
| Heat distortion temp. (° F., 264 p.s.i.) | 368 | 371 |
| Tensile strength (p.s.i.) | 10,400 | 8,600 |
| Tensile modulus (p.s.i.×$10^5$) | 3.03 | 2.70 |
| Flexural strength (p.s.i.) | 14,700 | 12,100 |
| Flexural modulus (p.s.i.×$10^5$) | 3.52 | 3.04 |
| Rockwell Hardness | 124 | 119 |

Where not otherwise indicated in the preceding examples, the polyphenylene oxide used is manufactured by the General Electric Company and coded 531–801. This polyphenylene oxide has a viscosity of $2.5 \times 10^5$ poise as measured by an Instron capillary viscometer at a temeprature of 550° F. and a shear rate of 4.2 sec.$^{-1}$. Typical examples are the poly(2,6-dimethyl-1,4-phenylene) ethers etc. described in U.S. Pats. 3,306,874 and 3,306,875 to Allan S. Hay. The general purpose polystyrenes employed herein is the general purpose grade coded 300 manufactured by the Shell Chemical Company. This material has a melt index of 8 g./10 min. as measured by ASTM Test D1238–62T. The impact grade polystyrene used herein is manufactured by Shell Chemical Company and is coded 324M. This material has a melt index of 3 g./10 min. as measured by ASTM Test D1238–62T.

The block poly(butadiene-b-styrene) of the type SBS used herein, is manufactured by Shell Chemical Company and sold under the trademark Thermolastic 125. This material has a melt index of 11 g./10 min. as measured by ASTM Test D1238–62T.

The block poly(butadiene-b-styrene) of the type SB used herein is manufactured by Phillips Petroleum Company and sold under the trademark Solprene and coded 1205. This material has a Mooney viscosity (ML–4) at 212° F.) of 47.

The random poly(butadiene-co-styrene) used herein is manufactured by the Texas-U.S. Chemical Co. and sold under the trademark Synpol 1500. This material has a Mooney viscosity (ML–4 at 212° F.) of 55.

The Noryl resin used herein is manufactured by General Electric Co. coded 731–701 and has a viscosity of $1.8 \times 10^4$ poise as measured by an Instrom Capillary Viscometer at a temperature of 550° F. and a shear rate of 10 sec.$^{-1}$. By spectroscopic analysis this resin analyses to have a composition of about 35% styrene and about 65% polyphenylene oxide.

The following ASTM tests were used to determine the data disclosed in Examples 1 through 21: heat distortion at 264 p.s.i. fiber stress—D648–56; notched Izod impact—D256–56 Method A; tensile strength and modulus—D638–64T; flexural strength and modulus—D709–66 and Rockwell hardness—D785–65.

Having thus described our invention what we claim and desire to protect by Letters Patent is:

1. A synthetic thermoplastic resin composition having improved impact properties and processability comprising a blend of:
   (A) a matrix comprising greater than 50% by weight of a thermoplastic polyphenylene oxide resin having the repeating unit:

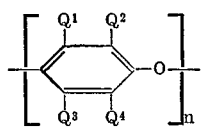

wherein $Q^1$ through $Q^4$ is a monovalent substituent selected from the group consisting of hydrogen, halogen, hydrocarbon radicals free of tertiary alpha-carbon atoms, halohydrocarbon radicals having at least two carbon atoms between the halogen atom and phenol nucleus and being free of tertiary alpha-carbon atoms, and halohydrocarbonoxy radicals having at least two carbon atoms between the halogen atom and phenol nucleus and being free of tertiary alpha-carbon atoms; and $n$ represents any whole integer greater than 100, into which is dispersed at a temperature above the fluxing temperature of said matrix,
   (B) correspondingly less than 50% by weight of a rubbery butadiene containing additive polymer having a tensile modulus between about $10^5$ and $10^9$ dynes/cm.$^2$, and selected from the group consisting of poly(butadiene-costyrene), poly(butadiene-b-styrene), or poly(butadiene-co-acrylonitrile).

2. The resin blend of claim 1 in which the butadiene-containing polymer is poly(butadiene-b-styrene).

3. The resin blend of claim 1 in which the butadiene-containing polymer is poly(butadiene-co-styrene).

4. The resin blend of claim 1 in which the butadiene-containing polymer is poly(butadiene-co-acrylonitrile).

5. The resin blend of claim 1 in which said matrix contains greater than 50% polyphenylene oxide, and less than 50% of homopolymers or copolymers of alkenyl aromatic compound thereof based upon the total weight of the resin matrix, said homopolymers or copolymers having a tensile modulus greater than $10^9$ dynes/cm.$^2$ 6. The resin blend of claim 5 in which said homopolymers are prepared from monoalkenyl aromatic compounds having the general formula:

(A) 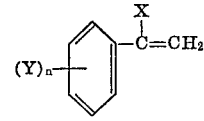

wherein X represent hydrogen or a lower alkyl radical such as a methyl or ethyl radicals; Y represents a member of the group consisting of hydrogen, halogens having atomic number of from 17 to 35, inclusive, and lower alkyl radicals containing from 1 to 4 carbon atoms; and $n$ represents an integer from 1 to 5, and said copolymers are prepared from monomers having the general formula given in (A) and monomers having the general formula:

(B) 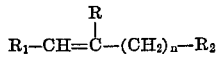

where R and $R_1$ each represent a substituent selected from the group consisting of hydrogen, halogen, an alkyl group having 1 to 4 carbon atoms, carboalkoxy, or R and $R_1$ compositely represent an anhydride linkage (—COOOC—)

and $R_2$ is hydrogen vinyl, an alkyl or alkenyl group having 1 to 12 carbon atoms, cycloalkyl, carboalkoxy, alkoxy alkyl, alkyl carboxy, ketoxy, halogen, carboxy, cyano, or pyridyl group an $n$ is an integer between 0 and 9.

7. The resin blend of claim 2 in which said poly(butadiene-b-styrene) rubber contains up to about 75% styrene.

8. The resin blend of claim 3 in which said poly(butadiene-co-styrene) rubber contains up to about 75% styrene.

9. The resin blend of claim 4 in which said poly(butadiene-co-acrylonitrile) contains up to about 75% acrylonitrile.

10. The resin blend of claim 5 in which the alkenyl aromatic resin is a general purpose polystyrene.

11. The resin blend of claim 5 in which the alkenyl aromatic resin is a high impact polystrene.

12. The resin blend of claim 11 in which the high impact polystyrene comprises less than 10% and greater than 0% of an elastomer selected from the group consisting of poly(butadiene-co-styrene), poly(butadiene-b-styrene), with the balance being polystyrene.

13. The resin blend of claim 12 in which the elastomer is in physical admixture with polystyrene.

14. The resin blend of claim 12 in which the elastomer has been grafted with polystyrene.

15. The resin blend of claim 10 in which the rubbery butadiene-containing additive polymer is poly(butadiene-b-styrene).

16. The resin blend of claim 10 in which the rubbery butadiene-containing additive polymer is poly(butadiene-co-styrene).

17. The resin blend of claim 10 in which the rubbery butadiene-containing additive polymer is poly(butadiene-co-acrylonitrile).

18. The resin blend of claim 15 in which said poly(butadiene-b-styrene) contains up to 75% styrene, with the corresponding balance being butadiene.

19. The resin blend of claim 16 in which said poly(butadiene-co-styrene) contains up to 75% styrene with the corresponding balance being butadiene.

20. The resin blend of claim 17 in which said poly(butadiene-co-acrylonitrile) contains up to 75% acrylonitrile with the corresponding balance being butadiene.

21. The resin blend of claim 11 in which the rubbery butadiene-containing polymer is poly(butadiene-b-styrene).

22. The resin blend of claim 11 in which the rubbery butadiene-containing polymer is poly(butadiene-co-styrene).

23. The resin blend of claim 11 in which the rubbery butadiene-containing polymer is poly(butadiene-co-acrylonitrile).

24. The resin blend of claim 21 in which said poly(butadiene-b-styrene) contains up to 75% styrene, with the corresponding balance being butadiene.

25. The resin blend of claim 22 in which said poly(butadiene-co-styrene) contains up to 75% styrene with the corresponding balance being butadiene.

26. The resin blend of claim 12 in which the rubbery butadiene-containing additive polymer is poly(butadiene-b-styrene).

27. The resin blend of claim 12 in which the rubbery butadiene-containing additive polymer is poly(butadiene-co-styrene).

28. The resin blend of claim 12 in which the rubbery butadiene-containing additive polymer is poly(butadiene-co-acrylonitrile).

29. The resin blend of claim 26 in which said poly(butadiene-b-styrene) contains up to 75% styrene, with the corresponding balance being butadiene.

30. The resin blend of claim 27 in which said random poly(butadiene-co-styrene) contains up to 75% styrene with the corresponding balance being butadiene.

31. The resin blend of claim 27 in which said poly(butadiene-co-acrylonitrile) contains up to 75% acrylonitrile with the corresponding balance being butadiene.

32. The resin blend of claim 13 in which the butadiene-containing additive polymer is poly(butadiene-b-styrene).

33. The resin blend of claim 13 in which the rubbery butadiene-containing additive polymer is poly(butadiene-co-styrene).

34. The resin blend of claim 13 in which the rubbery butadiene-containing additive polymer is poly(butadiene-co-acrylonitrile).

35. The resin blend of claim 32 in which said poly(butadiene-b-styrene) contains up to 75% styrene, with the corresponding balance being butadiene.

36. The resin blend of claim 33 in which said random poly(butadiene-co-styrene) contains up to 75% styrene with the corresponding balance being butadiene.

37. The resin blend of claim 34 in which said poly(butadiene-co-acrylonitrile) contains up to 75% acrylonitrile.

38. The resin blend of claim 14 in which the rubbery butadiene-containing additive polymer is poly(butadiene-b-styrene).

39. The resin blend of claim 14 in which the rubbery butadiene-containing additive polymer is poly(butadiene-co-styrene).

40. The resin blend of claim 14 in which the rubbery butadiene-containing additive polymer is poly(butadiene-co-acrylonitrile).

41. The resin blend of claim 38 in which said poly(butadiene-b-styrene) contains up to 75% styrene with the corresponding balance being butadiene.

42. The resin blend of claim 39 in which said poly(butadiene-co-styrene) contains up to 75% styrene with the corresponding balance being butadiene.

43. The resin blend of claim 40 in which said poly(butadiene-co-acrylonitrile) contains up to 75% acrylonitrile with the corresponding balance being butadiene.

44. A process for making the blend defined in claim 1 which comprises:
  (A) contacting said rubbery butadiene-containing additive polymer with said polyphenylene oxide resin matrix in suitable mixing means;
  (B) applying sufficient heat to raise the temperature of said polymers above the softening point temperature of said polyphenylene oxide;
  (C) applying sufficient shear to disperse said rubbery butadiene-containing polymer into said resin matrix.

45. A process for making the blend defined in claim 5 which comprises:
  (A) contacting said butadiene-containing additive polymer with said polyphenylene oxide and an alkenyl aromatic resin in suitable mixing means;
  (B) applying sufficient heat to raise the temperature of said polymers above the softening point temperature of said polyphenylene oxide;
  (C) applying sufficient shear to produce a dispersion of the rubbery butadiene-containing additive polymer, polyphenylene oxide and alkenyl aromatic resin.

46. The process defined in claim 44 in which the heat applied to said mix is supplied by external means.

47. The process defined in claim 45 in which the heat applied to said mix is supplied by external means.

48. The process defined in claim 44 in which the heat applied to said mix is developed by, and said dispersion achieved by shear in said mixing means.

49. The process defined in claim 45 in which the heat applied to said mix is developed by, and said dispersion achieved by shear in said mixing means.

50. The process defined in claim 48 in which additional heat is supplied to said mix by external means.

51. The process defined in claim 49 in which additional heat is supplied to said mix by external means.

References Cited
UNITED STATES PATENTS

| | | | |
|---|---|---|---|
| 3,356,761 | 12/1967 | Fox | 260—874 |
| 3,373,226 | 3/1968 | Gowan | 260—874 |
| 3,383,340 | 5/1968 | MacCallum et al. | 260—887 |
| 3,383,435 | 5/1968 | Cizek | 260—874 |
| 3,476,832 | 11/1969 | Pritchard | 260—887 |
| 3,429,850 | 2/1969 | Holoch | 260—876 |
| 3,487,127 | 12/1969 | Eichak et al. | 260—876 |

OTHER REFERENCES

Railsback et al., "Butadiene-Styrene Block Copolymer for Molded and Extruded Goods," Rubber Age, January 1964, pp. 583–89.

MURRAY TILLMAN, Primary Examiner

H. W. ROBERTS, Assistant Examiner

U.S. Cl. X.R.

260—47 R, 874, 876 R, 877, 892